(12) United States Patent
Aslam (10) Patent No.: US 12,264,283 B2
(45) Date of Patent: Apr. 1, 2025

(54) LOWER-COST, HIGHER EFFICIENCY, ENVIRONMENTALLY FRIENDLY, SELF-DISPERSIBLE RECOVERY, AND STIMULATION FLUID FOR ENHANCED OIL RECOVERY (EOR) AND IMPROVED OIL RECOVERY (IOR)

(71) Applicant: Naveed Aslam, Bellaire, TX (US)

(72) Inventor: Naveed Aslam, Bellaire, TX (US)

( * ) Notice: Subject to any disclaimer, the term of this patent is extended or adjusted under 35 U.S.C. 154(b) by 93 days.

(21) Appl. No.: 17/576,927

(22) Filed: Jan. 15, 2022

(65) Prior Publication Data

US 2023/0227715 A1    Jul. 20, 2023

(51) Int. Cl.
*C09K 8/92*    (2006.01)

(52) U.S. Cl.
CPC ...................... *C09K 8/92* (2013.01)

(58) Field of Classification Search
None
See application file for complete search history.

(56) References Cited

U.S. PATENT DOCUMENTS

| | | | | |
|---|---|---|---|---|
| 10,135,063 | B2* | 11/2018 | Huang | H01M 8/16 |
| 11,091,369 | B2* | 8/2021 | Hunter | C10M 103/02 |
| 11,390,528 | B2* | 7/2022 | Zhamu | H01M 10/052 |
| 2012/0245058 | A1* | 9/2012 | Monteiro | C09K 8/032 |
| | | | | 507/131 |
| 2017/0088788 | A1* | 3/2017 | Huang | C10M 139/04 |
| 2019/0305309 | A1* | 10/2019 | Huang | C01B 32/184 |
| 2020/0031677 | A1* | 1/2020 | Zhamu | C01B 32/20 |

* cited by examiner

*Primary Examiner* — John J Figueroa
(74) *Attorney, Agent, or Firm* — Woods Oviatt Gilman LLP; Trent V. Bolar, Esq.

(57) ABSTRACT

A well stimulation method based on a self-dispersible and non-surface functionalized dispersion fluid to recover hydrocarbons from subterranean formation in conventional and non-conventional mode is described and claimed. The method includes introducing a self-dispersible, non-functionalized, three-dimensional (3D) crumpled graphene balls/structures into a water slug, a gas slug, a liquefied gas slug, a natural gas liquid slug, or a diesel slug. The resulting fluid containing self-dispersible, 3D crumpled structures is introduced into the subterranean hydrocarbon bearing formation. The said self-dispersion fluid may also contain a cocktail based on varying degree of hydrophilicity and hydrophobicity of 3D crumpled graphene balls, where the role of 3D hydrophilic crumpled graphene balls is to keep dispersion stable whereas, the role of hydrophobic 3D crumpled graphene balls is to interact with hydrocarbons and thus stimulating their dislodging or desorption from the rocks of subterranean hydrocarbon formation. The recovery fluid containing self-dispersible, non-functionalized stimulating agent is inserted into the underground formation containing hydrocarbons before, during or after the introduction of water, gas, liquefied gas, vaporized gas. This self-dispersible, and non-functionalized dispersion fluid provides a lower-cost, higher efficiency, environmentally friendly method for EOR and IOR.

12 Claims, 10 Drawing Sheets

LOWER-COST, HIGHER EFFICIENCY, ENVIRONMENTALLY FRIENDLY, SELF-DISPERSIBLE RECOVERY, AND STIMULATION FLUID FOR ENHANCED OIL RECOVERY (EOR) AND IMPROVED OIL RECOVERY (IOR)

RELATED APPLICATIONS

Not applicable

FIELD OF THE INVENTION

The present invention relates to a self-dispersible, lower-cost, higher efficiency, environmentally friendly and totally recyclable method for enhanced or improved recovery of hydrocarbons by combining both secondary and tertiary phases of recovery into one thus achieving more hydrocarbon recovery at lower pore volume injection using a self-dispersible recovery fluid based on a self-dispersible, non-surface functionalized, 3D crumpled graphene balls and/or in combination with carrier fluids such as deionized water, formation water, gases, liquefied natural gas, natural gas liquids and diesel.

BACKGROUND OF INVENTION

The following discussion is provided solely to assist the understanding of the reader and does not constitute an admission that any of the information discussed, or references cited constitute prior art to the present invention.

The production of oil in conventional mode generally has three stages. The primary phase utilizes the natural pressure differences between the wells and reservoirs. The improved, or secondary stage uses water flooding to continually supply reservoir energy. The enhanced or tertiary, stage uses chemical flooding, polymer, surfactant, alkali to reduce the interfacial tension and control mobility ratio of fluids being used to supply energy to reservoir. During the tertiary stages of recovery, the uniform distribution of fluids in a mature heterogenous formation also become a critical issue due to pathways of least flow resistance. The chemical additives thus can also aid in ensuring the proper fluid distribution in the subterranean formation, by partially blocking the pathways of least resistance thus enhancing the contact of injectant fluids with oil in adjacent zones and enhancing the oil recovery. Approximately, there are four million oil and gas wells across the globe. Though almost 80% of these are already in the mature phase of their life where they expended their primary energy and are on some sort of external energy-based drive mechanism. Usually, hydrocarbon recovery from up-stream wells can be categorized into primary, secondary, and tertiary phases. The primary phase is characterized by 8-10% recovery of hydrocarbons with minimum external energy input whereas, secondary phase can add another 5-7% of recovery with moderate amount of energy expenditures in terms of water, steam, or surfactant drives. However, the tertiary phase requires considerable energy input and may add another 10-15% into overall recovery from a given well. Tertiary phase of oil recovery could involve stimulation mechanisms such as energized fluids for example carbon dioxide, nitrogen natural gas, NGLs, water alternating gas, surfactant alternating gas and polymer flooding. Despite these elaborate recovery schemes good 60-80% oil is usually left in place as current methods are not economical to push the recovery envelope beyond 20-40%.

During the aging phase of oil and gas wells the interplay of multiple mechanisms may contribute to production decline and reservoir maturity some of these mechanisms are: a.) mechanical failures of well infrastructure; b.) abrupt reduction in permeability and increase of liquid loading due to drop in bottom hole pressure; c.) fines accumulation and migration to productive reservoir sections due to altering velocities in flow field; d.) deposits due to scaling, paraffins/asphaltenes and clay swelling; e.) hydrocarbon block; f.) water block; g.) fracture collapse.

Productivity of Oil & Gas can be enhanced by a class of stimulation methods such as low-cost method of acidizing at one end of spectrum and high-cost method of refracturing at the other end. The goal of all the stimulation methods is to increase the permeability of rock or lower the oil viscosity for its optimum flow and hence the enhanced recovery. Despite great breakthroughs and current developments all the stimulation methods can lead to a 30-40% recovery in conventional reservoirs and 10% recovery in unconventional reservoirs at maximum.

Currently, oil recovery using chemical methods is strongly limited by the low prices of oil, the potential of pollution of underground water and harsh reservoir conditions. The flooding with nanofluids could be promising as they can enhance the recovery and could be a good alternative to chemical flooding. The applications of Janus nanosheets shows good performance even at lower concentrations. However, under harsh reservoir conditions of heat and salinity the applications of these surface functionalized/surface modified nanosheets is questionable as it may lead to the degradation of surface modifications due to reservoir conditions thus leading to restacking and reduction in specific surface area.

The emergence of two-dimensional 2D graphene sheets as an important additive for EOR/IOR is interesting as GO nanosheets can show the specific surface area of 2500 $m^2/g$, making them very desirable option for variety of upstream stimulation applications. However, major roadblock is the tendency of nanosheets to aggregate i.e., restacking due to strong inter-sheet adhesion such as Vander Waals attraction, restacking of these nanosheets will adversely reduce their available specific surface and may drastically influence their performance in EOR/IOR application. One possible solution is to functionalize one face with alkylamine as described by patent application US2016/042519 and use these amphiphilic sheets for EOR/IOR. Though interesting idea its application under real reservoir conditions is questionable due to high heat and severe conditions of salinity which could lead to degradation of surface functionalities in actual reservoir conditions and thus inducing restacking and reduction of specific surface area also during the application there is no guarantee that these 2D sheets will maintain their correct orientation in water solution or brine and may orient themselves in a way that they could lead to restacking and thus aggregation and reduction in the surface area and their ability to extract oil from underground formation.

The requirement for surface functionalities for the application of 2D graphene sheets in the sub-terrain formations also need the tailoring of surface functionalities according to the type of underground formation and conditions of reservoirs, thus leading to specific solution for a specific region or even specific formation within the specific region. Thus, inherently, 2D graphene sheets cannot provide a global solution with one product which could be universally applied across all the formations in all the regions. This will result in increase in the cost as well as resistance for wider adaptability as it may become difficult to translate experience from one formation into others and every time a new pilot will be required further increasing the costs and reducing the probability of wider adaptability. This also could be a potential barrier for prior art of well stimulation or wettability alteration with surface functionalized nanoparticles.

An attractive option is dispersing 2D-nanosheets in water, it's a good option due to lower cost and eco-friendliness. However, it is difficult to achieve stable 2D nanosheets based aqueous suspensions because of intrinsic hydrophobic properties and layered materials. So, they require stabilizers and performance enhancers to prevent the aggregation especially in harsh conditions where the surface functionalities are prone to degrade.

A need therefore, exist for methods, and additives which can improve the enhanced oil recovery efficiency without any surface functionalization or surfactant treatments.

A possible solution could be to transform 2D graphene nanosheets into three-dimensional (3D) crumpled balls. In contrast, to 2D flat nanosheets the crumpled graphene 3D balls can have high free volumes and excellent compressive properties and can be tightly packed. These balls can have a specific area of around 1500 $m^2/g$. Most interesting is that crumpling structures eliminate any layer stacking without grafting any specific surface functionalization.

Jiang Yang; Sixue Jil; Ran Li; Wenlong Qin and Yongjun Lu. Advances of nanotechnologies in oil and gas industries. ENERGY EXPLORATION & EXPLOITATION•Volume 33•Number 5•2015 pp. 639-657: Yang et. al., describes various applications of nano materials in upstream Oil & Gas applications.

Madhan Nur Agista; Kun Guo; Zhixin Yu. A State-of-the-Art Review of Nanoparticles Application in Petroleum with a Focus on Enhanced Oil Recovery Appl. Sci. 2018, 8, 871; Nur Agista et. al. provides a review of Nanoparticles applications in EOR.

Fakoya M F; Patel H and Shah S N: Nanotechnology: Innovative Applications in the Oil & Gas Industry. Int J Glo Adv Mat, 1(1):16-30 (2018): Fakoya et. al. described the major applications of nanoparticles, their potential benefits, and associated economical and/or technical challenges and solutions in the Oil & Gas applications.

Zhang Zhe and An Yuxiu: Nanotechnology for the oil and gas industry—an overview of recent progress; Nanotechnol Rev 2018; 7(4): 341-353; Zhe et. al. has provided the summary of recent years research on nanotechnology in drilling, completion, reservoir protection, enhance-oil-recovery (EOR), sensing and imaging techniques, stimulation techniques in oil and gas migration and accumulation.

Dan Luo; Feng Wang; Jingyi Zhu; Lu Tang; Zhuan Zhu; Jiming Bao; Richard C Wilson; Zhaozhong Yang and Zhifeng Ren: Secondary Oil Recovery using Graphene-Based Amphiphilic Janus Nanosheet Fluid at an Ultralow Concentration. Ind. Eng. Chem. Res., 2017, 56(39), 11125-11132; Luo et. al provides a summary of application of surface functionalized graphene nanosheets in the enhanced oil recovery at low concentration.

Following references describe some more methods of EOR & IOR through stimulation with nanoscale materials.
[1] U.S. Pat. No. 11,028,316: Tunable injection fluid based on natural gas liquids, gas, and nanoparticles for improved hydrocarbon recovery
[2] N. A. Ogolo et al: "Enhanced Oil Recovery Using Nanoparticles". SPE Saudi Arabia Section Technical Symposium and Exhibition, Jan. 1, 2012 (Jan. 1, 2012), XP55561116, DOI: 10.2118/160847-MS, p. 1-p. 5.
[3] Swaminathan Ponmani et al: "Applications of Nanotechnology for Upstream Oil and Gas Industry", Journal of Nano Research: JNANOR, vol. 24, Jan. 1, 2013 (Jan. 1, 2013), pp. 7-15, XP55560932, CH, ISSN: 1662-5250, DOI: 10.4028/www.scientific.net/JNanoR.24.7, p. 7-p. 13.
[4] U.S. Pat. No. 10,801,310: Using gases and hydrocarbon recovery fluids containing nanoparticles to enhance hydrocarbon recovery
[5] Peter J. Boul and Pulickel M. Ajayan, "Nanotechnology Research and Development in Upstream Oil and Gas". Energy Technol. 2020, 8, 1901216.
[6] U.S. Pat. No. 10,557,078 B2: Brine Resistant Silica Sol

SUMMARY OF THE INVENTION

In most cases approximately 80-90% of original oil in place (OOIP) remains in the reservoir after the primary phase of recovery. Due to the availability of natural pressure energy the primary phase of recovery requires minimum intervention and usually has high return on energy invested to recover oil from a young reservoir. As the reservoir matures the natural energy is depleted and additional recovery will require some form of intervention. These phases of interventions are usually classified as secondary and tertiary phases. During the secondary phase water is used as an interventional fluid and medium to energize the reservoir for another 10-20% of recovery. In most cases almost 60-70% of oil remains in reservoir after water stimulation phase is over. This secondary phase is followed by a more complex tertiary phase which could involve a variety of interventional methods such as surfactant flooding, energized fluids, polymer flooding, and nanofluid based flooding. In general tertiary phase can add another 10-20% of recovery and is usually very expensive. During this phase a point comes in the life of reservoir where a decision is made either to terminate tertiary phase as it might not be economical to further carry out the recovery or continue stimulating the reservoir with variety of tertiary interventional methods. Usually 50-70% of OOIP may remain in a reservoir as it may not be economically viable to invest energy and resources to bring this oil out. Of-course this also depends on prevailing crude oil prices and supplies but as low and moderate price environment is becoming a new norm vast majority of reservoirs will be abandoned as energy investments are becoming massive to extract new energy out.

The EOR methods of tertiary phase also attract serious scrutiny and may raise red flags due to adverse safety and environmental factors such as flammability, biodegradability, bioaccumulation, toxicity, water pollution of surfactants, polymers, nanoparticles and their surface functionalities and other additives used during this phase.

The economics of recovery is also compromised due to high concentration requirements of salts, acids, polymers, surfactants, and nano materials even though theoretical requirements might dictate 2% but actual reservoir and rock conditions could demand concentrations as high as 6-9%, thus adversely affecting the overall economics of oil extraction from a given reservoir during the mature phase of its life.

This invention provides a universal method which can be applied to all sort of reservoirs and rocks and for all kind of reservoir conditions of pressure, heat, and salinity of formation water. This method can guarantee high oil recovery at much lower concentration of say 0.001%. The typical concentrations of 0.0005% to 0.1% could yield very high recoveries. Most importantly the universal additive used here of crumpled 3D graphene balls/structures does not require any surface modifications or stabilizer additives in the fluid. This self-dispersible fluid can be used early in the life of a reservoir i.e., probably well ahead of tertiary phase and can be used along with the water drive mechanisms thus providing a simple way to combine the secondary and tertiary phases into one and subsequently reducing the large amounts of water required during the secondary phase. Thus, the method of this invention suggests that at a much lower pore volume inject much higher rate of oil can be recovered. Moreover, the additive used are self-dispersible, biodegradable and have no adverse safety and environmental risk factors in terms of flammability, bioaccumulation, or toxicity. The method described here thus, suggest improving the recovery economics and make EOR/IOR viable even during a perpetuating low price market scenario.

BRIEF DESCRIPTION OF THE DRAWINGS

FIG. 7 is the method to manufacture three-dimensional crumpled graphene balls through a thermal reduction process with tunable degree of hydrophobicity which is directly linked to the degree of thermal reduction. The graphene oxide (GO) (1) and water (2) are taken into a feeding vessel (3) from which a pump (4) takes the GO suspended in water and sprays into a thermally heated tube (6), the tube is placed in a tubular furnace (7), the heating is applied in the annulus space (5) through electric heating elements or burners. The temperature increases along the length of tube (6), with temperatures are in lower range around inlet and increases towards outlet. Inside the tube (6) the aqueous GO stream expands and GO undergoes thermal reduction along the length of tube thus creating 3-D GO structures with varying degree of hydrophobicity, these 3D balls are collected through protruding nozzles (8) along the tube length, and 3D balls are taken into collection pipes (9 & 10) which discharge into the collection vessel (11) where 3D balls are collected. At the outlet of tube, the remaining GO balls are taken into outlet header (12) which communicates with collection vessel (13) thus collecting all the balls and discharging the inert gas (14) into atmosphere.

FIG. 9: The flooding mechanism of a self-dispersible, dispersion fluid for enhanced oil recovery in a subterranean residual oil zone. Here, the self-dispersion fluid is injected through an injector well (1) in the underground formation. The residual oil zone (2) of subterranean formation contains certain degree of oil. The oil is recovered from production well (3) along with self-dispersible fluid. This fluid is composed of hydrophilic (5) and oleophilic (4) 3-D crumpled graphene balls. The fluid is injected through a surface injection facility by an injection well (2). The self-dispersion injection fluid sweeps through reservoir by the injectant pressure or driving fluid which could be either water here or gases like carbon dioxide and nitrogen. The oleophilic (6) crumpled 3D balls when encounter residual oil zone (2) and main oil pay zone (2), selectively absorbs crude oil, and are filled with oil, this oil filled balls are taken to surface along with hydrophilic balls and are recovered at surface and reused by washing with water.

FIG. 10: The huff and puff mechanism of a self-dispersible, dispersion fluid for enhanced oil recovery in a subterrain residual oil zone or oil reservoir. (A) Here, the huff part of recovery mechanism is described, where self-dispersion fluid is injected through surface facility (3) by a well which act as an injector (4) in this part of recovery, the injected self-dispersion fluid is distributed such that it can encounter main oil zone (5) and residual zones (6 and 7). The self-dispersion fluid contains hydrophilic three-dimensional crumpled GO balls (2) and oleophilic three-dimensional crumpled GO balls (3). After the injection of self-dispersion fluid, the injection well is shut-off to provide certain amount of time for self-dispersion fluid to soak-in the oil-bearing zones of reservoir. (B) Here, the puff part of recovery is depicted. After soaking when reservoir is opened a mixture of self-dispersion fluid and oil flow towards the well which now act as producer (4) from which produced oil and recovery fluid flows towards the high-pressure separator at the surface facility (4). The oleophilic three-dimensional balls when encounter residual oil zones (6 and 7) and main oil zone (5) become filled with reservoir oil as shown by oil filled ball (8). These 3D balls are washed at surface with water and recovered for second cycle while oil and water is separated.

DETAILED DESCRIPTION OF THE INVENTION

A. General Description of Invention

This invention provides a lower-cost and an environmentally friendly dispersion fluid to recover oil from underground formations. Usually, the fluids containing the nano materials in EOR/IOR setting may aid in oil recovery during the tertiary phase due to three possible mechanisms: a) oil-water interfacial tension reduction; b) wettability alteration; c) induction of the structural disjoining force. The dispersion fluid described in this invention is unique as along with these three mechanisms it also provides a means by which oil could selectively attach to 3D hydrophobic structures and carried to the surface. Thus, the one embodiment of this invention concerns the selective adsorption of oil droplets on the crumpled 3D structures thus providing a means to carry oil from the formation to surface in an efficient manner. The oil carrying capacity of these 3D structures can range from 50 ton-500 tons/ton of 3D balls. Thus, providing a lower-cost, highly efficient, non-toxic, environmentally friendly, biodegradable dispersion fluid for EOR and IOR recovery processes.

Figure 1:
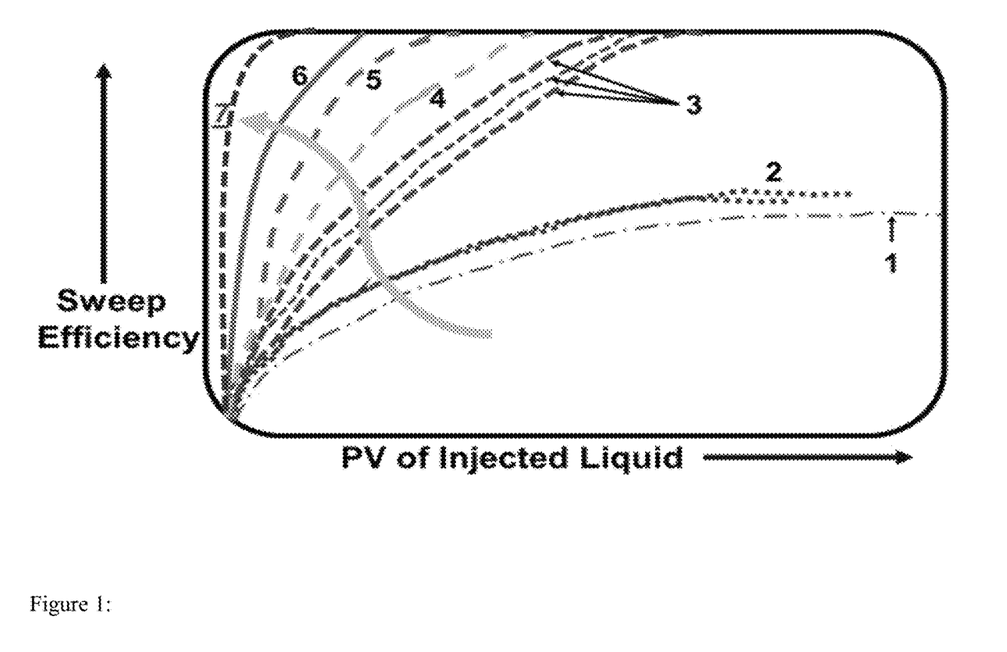
FIG. 1 is a cartoon describing the relationship between the pore volume injected of the fluids during secondary and tertiary phases of recovery and sweep efficiency. Here, (1) shows the profile of conventional water flood; (2) shows steam assisted flood; (3) shows surfactant assisted flood; (4) shows polymer flood; (5) shows non-aqueous flood such as Y-grade, NG, LNG, associated gas, or diesel; (6) and (7) shows floods based on the self-dispersion fluids described in this invention.

In another embodiment of this invention the self-dispersible, water-based dispersion fluid if applied during the flooding process of secondary oil recovery can be very attractive as it could drastically reduce the costs by eliminating the need for the tertiary recovery stage and could also save large amounts of power, chemicals, surfactants, water, and other additives. This option could be interesting especially when the price of oil remains low for long period of time. FIG. 1 shows the relationship between pore volume injected and possible recovery of hydrocarbons from underground formation. The FIG. 1 describes how the pore volume injected of the fluids during secondary and tertiary phases of recovery will influence the sweep efficiencies. It shows the profile of conventional water flood (1) also steam assisted flood (2), surfactant assisted flood (3), polymer flood (4), non-aqueous flood such as Y-grade, NG, LNG, associated gas, or diesel (5). It also shows the recovery versus injectant profiles based on the self-dispersion fluids described in this invention (6 and 7). This figure suggests that if the novel self-dispersion fluids as described in this invention are used early-on during the secondary phase of recovery, the pore-volume injectant requirements are considerably reduced thus, the shape-induced, self-dispersible fluids described in this invention can provide a method to combine secondary and tertiary phases into one thus saving considerable costs.

Figure 2:
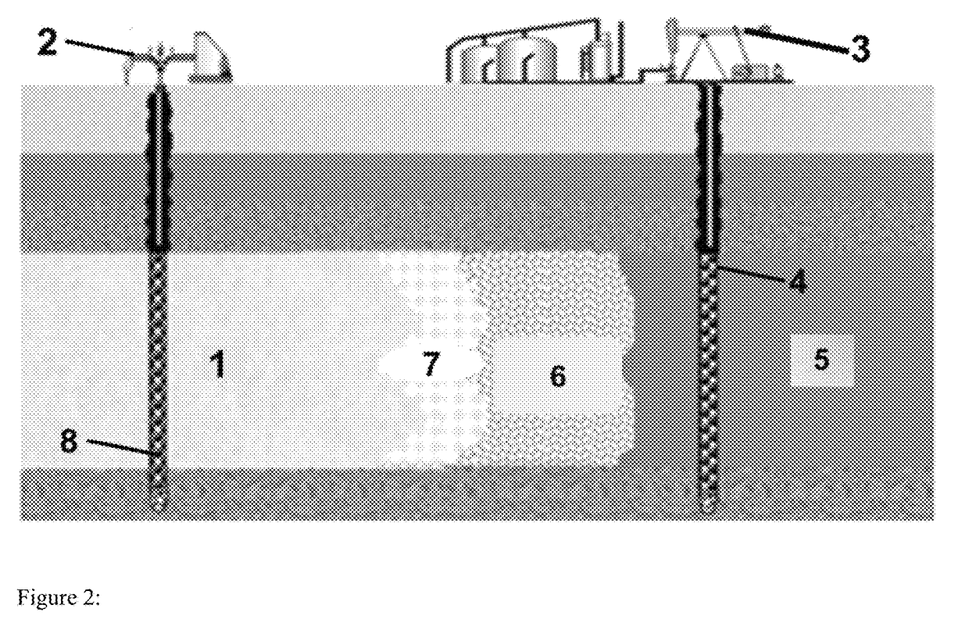
FIG. 2 is a schematic of flooding mode of recovery by injecting self-dispersion recovery fluid in the underground formation (1). The surface facility (2) is installed at the injection well (8) to inject the self-dispersible fluid and surface facility (3) is installed at the production well (4) to recover the oil, gas, and self-dispersible fluid coming from formation. The self-dispersible fluid front (7) contacts with residual oil (6) and main pay-zone oil (5) when is pushed into reservoir by driver fluid such as water and gas.

In one embodiment the FIG. 2, describes the flooding process of subterranean formation whereby, novel recovery fluid based on shape-induced, self-dispersible 3-D structures into the underground formation (1). The surface facility (2) is installed at the injection well (8) to inject the self-dispersible, 3-D graphene balls-based fluid and surface facility (3) is installed at the production well (4) to recover the oil, gas, and self-dispersible fluid coming from formation. The shape-induced, self-dispersible fluid front (7) contacts with residual oil (6) and main pay-zone oil (5) when is pushed into reservoir by driver fluid such as water and gas.

Figure 3:
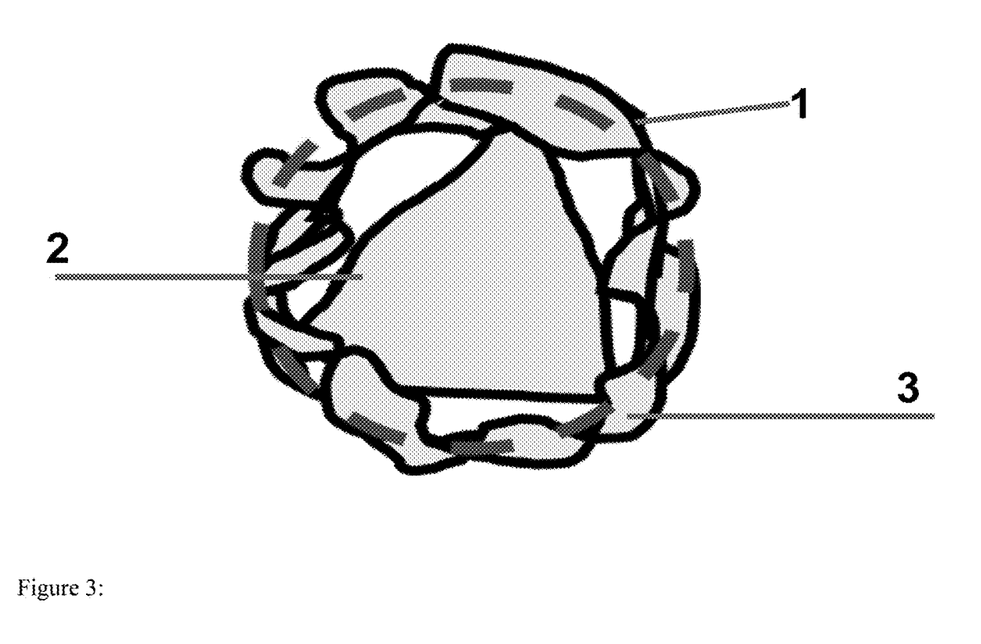
FIG. 3 is a schematic of a crumpled 3-dimensional graphene structure to be used in a self-dispersible stimulation fluid: (1) outer boundary of three-dimensional graphene ball; (2) inner hollow core of the 3-D ball; (3) shell-like structure around outer dimensions of 3-D ball.
Figure 4:
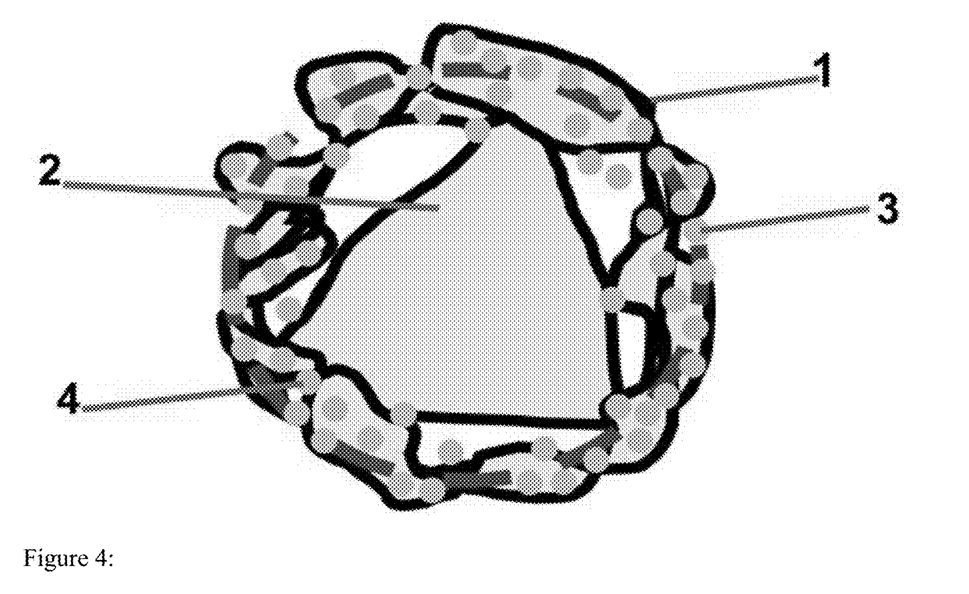
FIG. 4 is a schematic of a recoverable, crumpled 3-dimensional graphene structure to be used in a self-dispersible stimulation but recoverable fluid: (1) outer boundary of three-dimensional graphene ball; (2) inner hollow core of the 3-D ball; (3) shell-like structure around outer dimensions of 3-D ball; (4) iron-oxide nanoparticles in the outer shell of a graphene ball.
Figure 5:
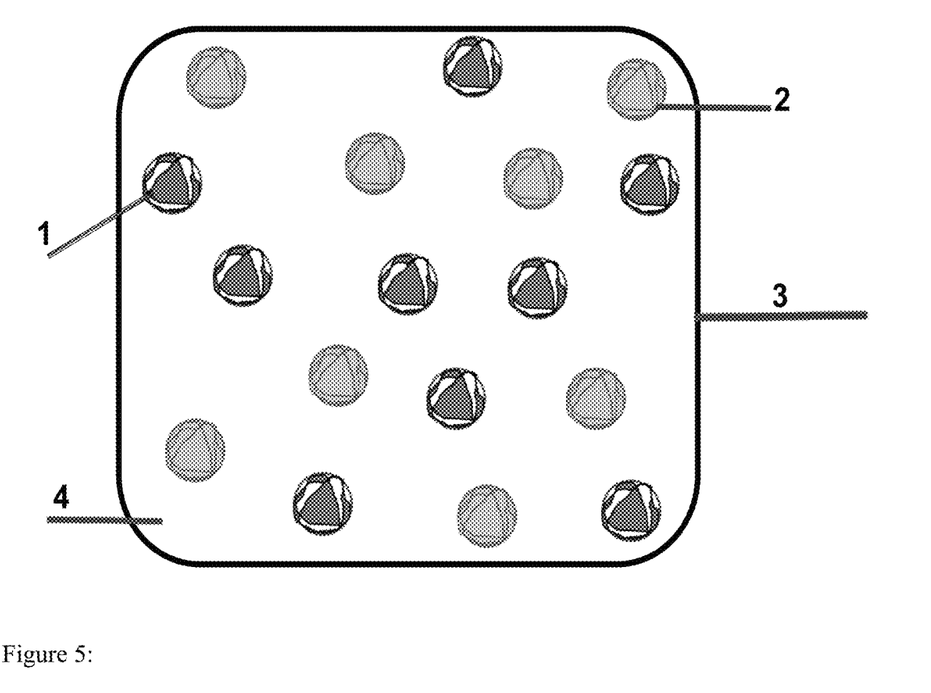
FIG. 5 is a diagram of the self-dispersible, dispersion fluid (3) composed of hydrophilic (1) and hydrophobic (2) 3-dimensional graphene balls in water (4).

Throughout this patent application the term "self-dispersion" is defined as: a relatively small volume of fluid obtained by blending or inserting or self-dispersing, non-functionalized three-dimensional, crumpled graphene balls/structures into fluids like deionized water, brackish water, seawater, produced water, diesel, liquefied natural gas, produced gas, ethane, natural gas liquids, propane, liquid carbon dioxide or gaseous carbon dioxide. The self-dispersion is obtained by a shape-induced phenomenon as due to crumpled three-dimensional shape these structures do not come close to each other and develop attractive interactions as shown in FIG. 3, FIG. 4 and FIG. 5. This shape-induced phenomenon provides excellent means to disperse the three-dimensional structures in water without any surface functionalities or adding any stabilizer specie into the dispersion fluid as depicted in FIGS. 3, 4 and 5. The resulting self-dispersion of 3D balls can perform specialized functions during secondary and tertiary phases of recovery. These functions can include the stability of dispersion, aggregation resistance, wettability alteration of rocks in subterranean formation, selective adsorption of oil on 3D balls and acting as cargo carrier of oil from underground formation to surface thus providing an efficient means to recover oil from mature reservoirs.

In one embodiment the FIG. 3 describes a crumpled 3-dimensional graphene structure to be used in a shape-induced, self-dispersible stimulation fluid: (1) outer boundary of three-dimensional graphene ball; (2) inner hollow core of the 3-D ball; (3) shell-like structure around outer dimensions of 3-D ball.

In another embodiment the FIG. 4, describes a recoverable, crumpled 3-dimensional graphene structure to be used in a shape-induced, self-dispersible stimulation but recoverable fluid: (1) outer boundary of three-dimensional graphene ball; (2) inner hollow core of the 3-D ball; (3) shell-like structure around outer dimensions of 3-D ball; (4) magnetic responsive, $Fe_3O_4$ nanoparticles in the outer shell of a 3D graphene balls which can lead to the recovery and reuse of these 3D balls for next cycle of flooding as described in FIG. 2.

In an additional embodiment of this invention FIG. 5 describes the self-dispersible, dispersion fluid (3) composed of hydrophilic (1) and hydrophobic (2), 3-dimensional graphene balls in water (4).

Another embodiment of this invention can advantageously combine the secondary and tertiary phases of recovery into one due to good water solubility or dispersion or shape-induced stability of 3D graphene/graphene oxide balls in various solvents. This could significantly improve the economics of EOR/IOR. It is also understood that more than one combination of self-dispersion fluids as shown in FIG. 6, may be added to underground hydrocarbon bearing formation along with the motive fluid such as water or gases like nitrogen or carbon dioxide.

Figure 6:
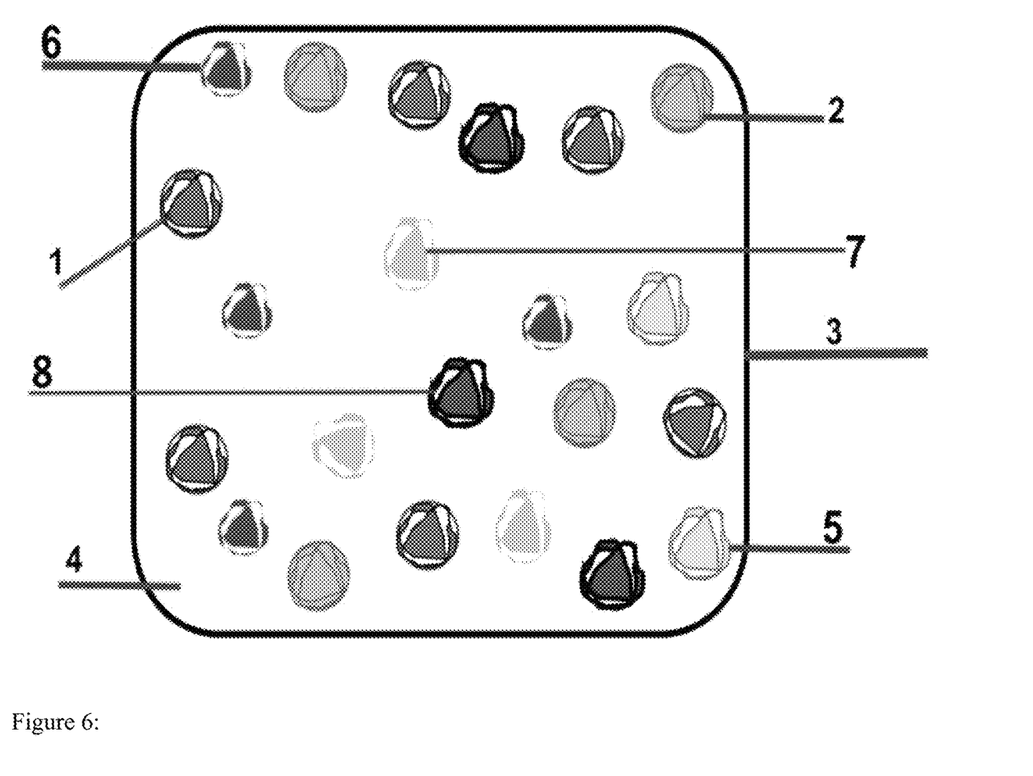
FIG. 6 is a diagram of the self-dispersible, dispersion fluid (3) based on a cocktail of hydrophilic 3-D balls (1) and 3-D balls with tunable degree of hydrophobicity (2, 5, 6, 7, 8) in water (4).

An additional embodiment of this invention could involve developing the EOR/IOR self-dispersion fluid based on a cocktail composed of several 3D, non-functionalized molecular entities with varying degree of hydrophobicity and hydrophilicity as described in FIG. 6. This may create a multifunctional fluid which can provide several different functionalities during well stimulation and recovery thus reducing overall cost and complexity of EOR/IOR operations. The FIG. 6 shows that multifunctional self-dispersion fluid (3), is based on cocktail of 3D graphene balls composed of hydrophilic 3-D balls (1) and 3-D balls with tunable degree of hydrophobicity (2, 5, 6, 7, 8) in water (4).

The self-dispersion described in this invention is characterized by the inherent solubility, dispersibility, hydrophobicity, hydrophilicity, and colloidal stability of three-dimensional, crumpled graphene structures into the deionized water or high salt water.

The key attributes of stable self-dispersions are attained without any surface functionalization, by chemical agents, biochemical agents, or polymers. The self-dispersibility is attained by fine-tuning the inherent characteristics of graphene surface through certain processing steps such as freeze drying, spray drying or thermal reduction.

Figure 7:
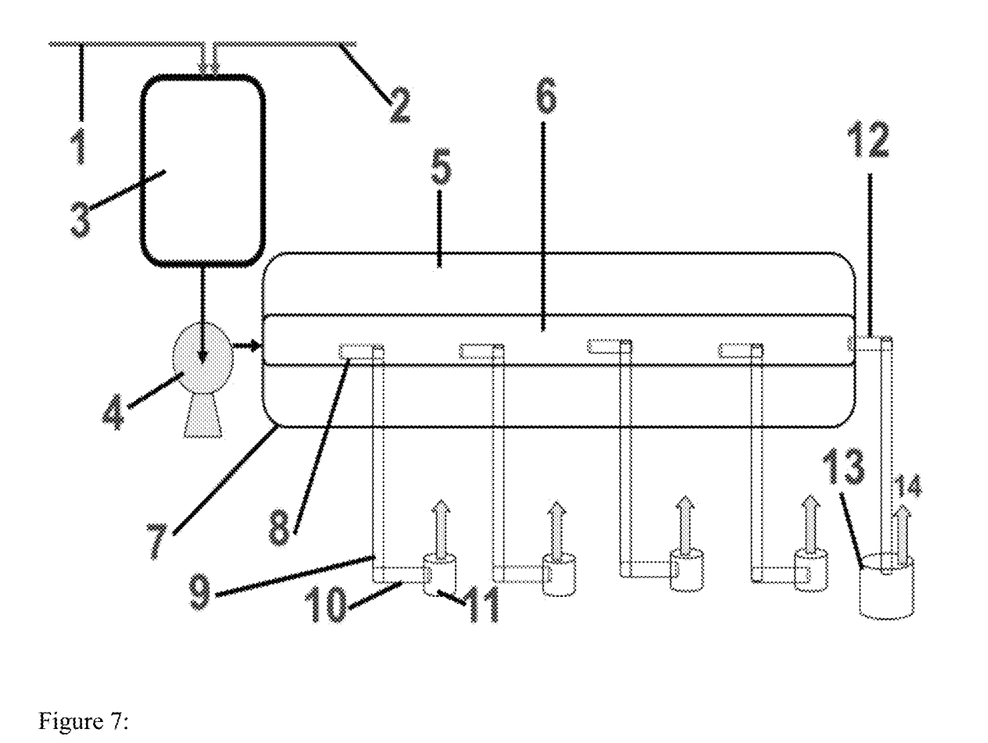

In another embodiment of this invention FIG. 7, describes the method to manufacture three-dimensional crumpled graphene balls through a thermal reduction process with tunable degree of hydrophobicity which can be directly linked to the degree of thermal reduction. The graphene oxide (GO) (1) and water (2) are taken into a feeding vessel (3) from which a pump (4) takes the GO suspended in water and sprays into a thermally heated tube (6), the tube is placed in a tubular furnace (7), the heating is applied in the annulus space (5) through electric heating elements or burners. The temperature increases along the length of tube (6), with temperatures in lower range around inlet and increases towards outlet. Inside the tube (6) the aqueous GO stream expands and GO undergoes thermal reduction along the length of tube thus creating 3-D GO structures with varying degree of hydrophobicity, these 3D balls are collected through protruding nozzles (8) along the tube length, and 3D balls are taken into collection pipes (9 & 10) which discharge into the collection vessel (11) where 3D balls are collected. At the outlet of tube, the remaining GO balls are taken into outlet header (12) which communicates with collection vessel (13) thus collecting all the balls and discharging the inert gas (14) into atmosphere.

Figure 8:
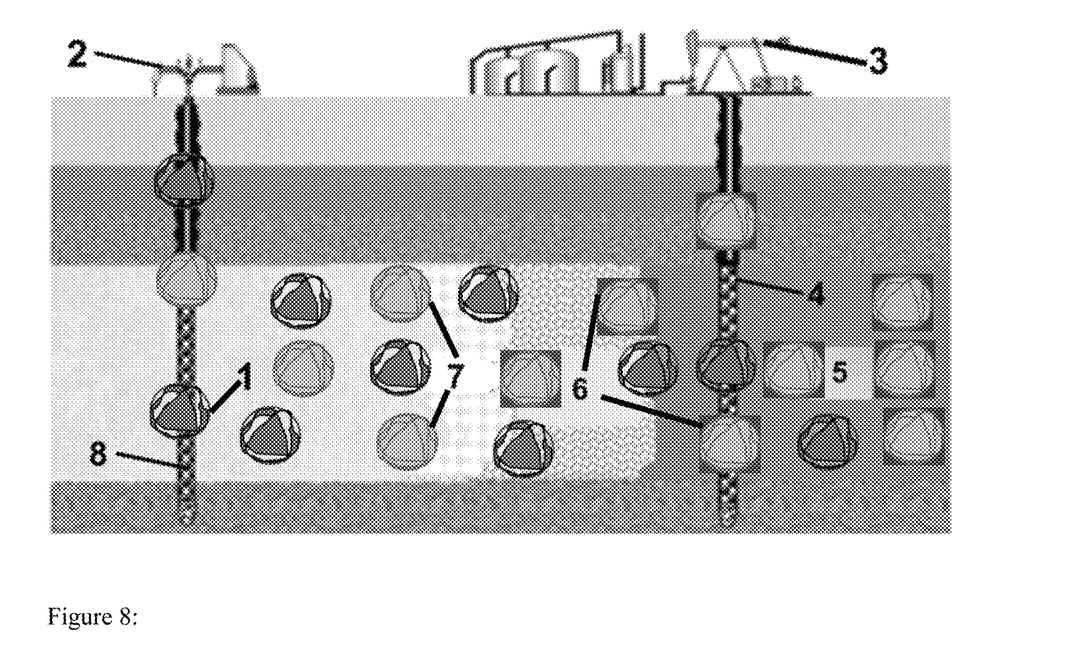
FIG. 8: The schematic of flooding mode of recovery by injecting bi-functional self-dispersion recovery fluid into subterranean formation. This fluid is composed of hydrophilic (1) and oleophilic (7) 3-D crumpled graphene balls. The fluid is injected through a surface injection facility (2) by an injection well (8). The self-dispersion injection fluid sweeps through reservoir by the injectant pressure or driving fluid which could be either water here or gases like carbon dioxide and nitrogen. The oleophilic (7) crumpled 3D balls when encounter residual oil zone (6) and main oil pay zone (5), selectively absorbs crude oil, and are filled with oil, this oil filled balls are taken to surface along with hydrophilic balls and are recovered at surface and reused by washing with water.
Figure 9:
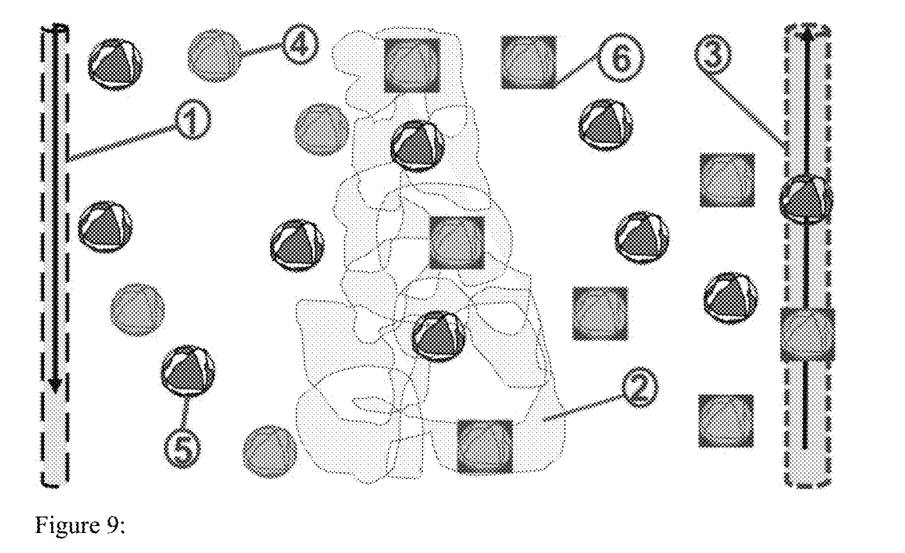
Figure 10:
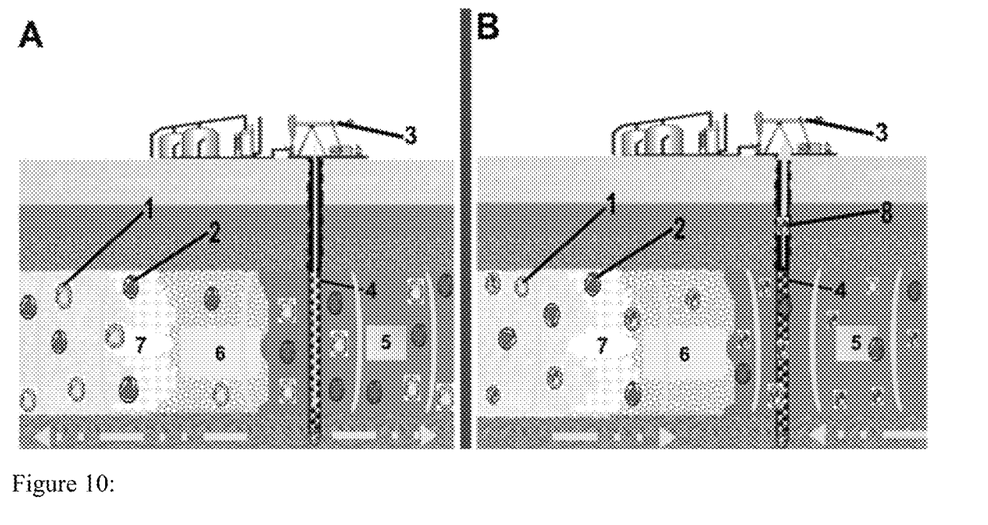

The first aspect of the instant claimed invention is a process of stimulating hydrocarbon recovery by flooding mechanism which is based on introducing the self-dispersion fluid in the underground formation through an injection well and withdrawing it through a production well as shown in FIG. 8.

In an additional embodiment in FIG. 8 a schematic of flooding mode of recovery by injecting bi-functional self-dispersion recovery fluid into subterranean formation is described. This fluid is composed of hydrophilic (1) and oleophilic (7), 3-D crumpled graphene balls. The fluid is injected through a surface injection facility (2) by an injection well (8). The self-dispersion injection fluid sweeps through reservoir by the injectant pressure or driving fluid which could be either water here or gases like carbon dioxide and nitrogen. The oleophilic (7) crumpled 3D balls when encounter residual oil zone (6) and main oil pay zone (5), selectively absorbs crude oil, and are filled with oil. The oil filled balls are taken to surface along with hydrophilic balls and are recovered at surface and reused by washing with water.

The flooding of underground formation as depicted in FIG. 8 by self-dispersion fluids, can result in the preferential desorption of hydrocarbons adsorbed in the subterranean rock as certain fraction of the said self-dispersion fluid will contain crumpled three-dimensional graphene structure which are oleophilic and thus, will preferentially be filled with crude oil. This crude filled crumpled graphene balls will be taken to surface by the flow of self-dispersion fluids or by additional motive fluid such as deionized water or produced water or energized fluids such as natural gas, carbon dioxide or nitrogen. Once at surface the layer of crumbled graphene balls is separated in a high-pressure separator and 3D-crumpled balls are regenerated through water washings thus further removing any crude oil contained within these balls and making them available for next cycle of crude extraction in IOR/EOR.

In one embodiment of the invention claimed here, the three-dimensional crumpled graphene balls also contain magnetically responsive iron i.e., $Fe_3O_4$ nanoparticles thus making them recoverable after recovery cycle through a magnetic field, significantly reducing the cost of self-dispersion fluids in EOR/IOR. This contrasts with surface functionalized nanoparticles and surfactants which once applied are lost forever and needs to be applied again thus increasing the frequency and cost of treatment.

In yet another embodiment of current invention the self-dispersible, crumpled three dimensional balls of graphene oxide "GO" are in the size range of 20-700 nanometers (nms) and in the concentration range of 0.0001-0.1% are dissolved or solubilized or suspended or dispersed into easily injectable fluid such as deionized water, salt water, diesel, NGLs or liquid carbon dioxide, the lower concentration of non-functional 3-dimmensiol graphene structures ensures very favorable economics for self-dispersion fluids.

Since self-dispersion fluids do not contain or require any specific surface functionalization they may provide a rather universal solution i.e., one solution across the reservoirs, formations of shale, sandstone, carbonate, residual zones etc., this standardization of treatment will be extremely beneficial as it will significantly reduce the costs thus making the invention described here as easily scalable solution even at lower crude market price situations unlike the nanoparticles or surfactants or surface treated nanosheets which require specific surface functionalization for specific formation and needs to tailored according to reservoir conditions of temperature, salinity, pressure or according to specific rock properties.

Though surface functionalization of silica and other nanoparticles and surface functionalized nano sheets as well as a multitude of available surfactants claimed to be resistant to brine and reservoir heat, they are only transiently effective in $\frac{1}{3}^{rd}$ (surface functionalized) of all the reservoirs where they had been applied thus making them a non-standard and formation specific solution. The reservoir conditions of brine and heat and rock surfaces as well as pH. are so harsh and diversified that in majority of the cases the surface functionalization is reduced or degraded as well significant losses of surfactants are observed that is why in practice 2-4% concentration of nanoparticles is needed, and 4-8% surfactant concentration is needed making them an expensive option, which also needs to be applied frequently. In case of self-dispersible 3D crumpled balls there is no surface functionalization so this provides a standard solution which can be applied universally at low concentrations and can be highly cost efficient with no environmentally adverse effects but can provide a standard solution for all kind of formations and reservoirs and one single treatment based on these 3D structures could be effective for extended period.

In the self-dispersion fluid the aggregation resistance is achieved due to shape-induced stability of 3D balls and their ability to stay discrete and maintain their individual characteristics in solvents like water or non-aqueous solvents like NGLs or LNG.

Graphene oxide (GO), reduced Graphene oxide (rGO) may provide a lower cost, environmentally friendly and highly efficient option for enhanced oil recovery in conventional wells as well as improved oil recovery in unconventional wells. The Graphene oxide is soluble in water, biodegradable, non-toxic and can form stable colloids without requiring any additional surface functionalities or surfactant additives. Intriguingly, the surface of GO can contain a wide range of oxygen containing functional groups such as hydroxyl, carboxyl, epoxy. Due to the presence of these groups GO is inherently water soluble and could easily be dispersed in water without any surface functional treatment. This hydrophilic character of GO can be altered by reducing its surface. So reduced Graphene oxide (rGO) can be made hydrophobic by selectively removing the oxygen functionalities and the character of rGO could be tuned as more oxygen functionalities are removed, more hydrophobic it could become. Thus, it is possible that by controlling the degree of reduction rGO could attain both hydrophobic and hydrophilic character. This could be interesting as certain level of hydrophilic character will ensure the dispersibility of rGO in injectant fluid but as soon it encounters the crude the hydrophobic properties will allow it to adsorb/absorb crude and aid in recovery process.

The oxygen containing functionalities on GO and rGO may play a key role in dispersibility, aggregation and chemical properties. In general, colloidal stability is attributed to balance between Vander Waals forces that promote aggregation and electrostatic repulsion which is dispersive-zeta potential, particle size distribution of agglomerates and aggregation kinetics are usually used to characterize the dispersibility of dispersions.

For EOR/IOR applications the crumpled three-dimensional graphene/GO/rGO structures could be economically incredibly attractive because they might require fewer 3D nanoparticles, saves enormous quantities of water; produces oil at high rate and may provide fast cost recovery.

The crumpled 3D graphene or GO or rGO balls can also be extremely attractive during EOR/IOR applications as they are also compression-aggression resistant.

If the nanofluids are used for reservoir stimulation during EOR phase it would be highly desirable that small nanoscale particles can remain dispersed in water, or oil without relying on molecular ligands as these molecular ligands might degrade in harsh reservoir conditions, therefore, self-dispersible three-dimensional crumpled graphene balls may not only be desirable but may also be a lower cost option as the concentration required for 3D balls described in this invention is very small i.e., between 0.0001 to 0.1. Moreover, in another embodiment of this invention these 3D crumpled graphene balls are decorated by magnetic particles which enables them to be recovered after the cycle of EOR/IOR is completed, thus further reducing the cost and environmental impact. The data shows that ultrafine crumpled particles do not stick to each other due to their specific crumpled shape. The crumpled shape creates certain dynamics which does not induce restacking.

The long-term stability of a dispersion dictates that small nanoscale particles are to remain well dispersed in water or oil without any molecular ligands. The crumpled 3D balls of graphene or graphene oxide provides an attractive option based on an analogy that pieces of paper that are crumpled do not readily stick to each other unlike the flat sheets so it is possible that 3D-crumpled graphene sheets will not stick to each other in water or another non-aqueous fluid such as crude oil or NGLs or diesel or LNG. This will provide a self-dispersing property for crumpled 3D balls in aqueous medium and non-aqueous medium.

Crumpled 3D balls have two key characteristics: a) shape-induced nonstick properties so make them aggregation resistant; b) strain hardened so they are stiffer under mechanical stress.

Because of multiple folding, crumpled paper balls become strain hardened and thus stiffer under mechanical stress, so that they can maintain their shape and shape-induced nonstick properties.

The crumpling of graphene or GO sheets into three-dimensional irregular or ball-like structures imparts the shape-induced nonstick properties to these three-dimensional structures.

The 3D graphene structure or balls can be individually dispersed in any solvent. including lubricant oils without any chemical functionalization.

Evidence shows that morphology of crumpled graphene balls is highly stable in the solid state and when dispersed in liquids.

The crumpled 3D balls do not unfold or collapse even after heating or pelletizing because they consistently do not form intimate contact with each other and their interparticle Vander Waals attraction is so weak that they can be individually dispersed in any solvent, including lubricant oils without the need for any chemical functionalization.

Interestingly, despite their compact appearance, the crumpled 3D graphene balls have a great deal of free volume and solvent-accessible surface area inside making them an effective absorber of oil, which could be released upon compression ensuring uninterrupted wetting of contact area.

It seems that aggregation of ultrafine particles could be a major problem in the stimulation fluids during EOR/IOR as these particles tend to come close to each other. Molecular ligands can help the particles to disperse, but they tend to degrade under harsh conditions of reservoirs such as heat and salinity. Therefore, self-dispersed particles without the need for surfactant are highly desirable during EOR flooding or Huff-n-puff mode of stimulation. We use the crumpled 3D particles in stimulation fluid for EOR which does not require any surface functionalization thus providing a universal solution for well stimulation and recovery.

One intriguing idea is to have self-dispersible and self-contained crumpled balls of graphene oxide GO in the size range of 30-200 nms, well dispersed into injectant secondary fluid i.e., water, DI or salt water or produced water at low concentration i.e., 0.0001-0.1%. Thus, providing the window of opportunity to combine both the secondary and tertiary recovery processes of oil into a one extended secondary recovery process which start earlier and last longer thus providing a case of a higher recovery at lower pore volume of injected fluid and additives.

The crumpled GO balls, dispersed into liquid or supercritical $CO_2$, where the self-dispersed 3D compressed GO balls directly dispersed or solubilize into $CO_2$ or in the form of microemulsion i.e., cGO balls dispersed into the water and water being stabilized and dispersed into supercritical CO2 and then this injectant is either passed through reservoir or in the Huff-n-puff configuration, injected and let be soaked and opened later for recovery of oil and crumpled 3D balls.

Cocktails of GO as injectant containing different levels of oxygen species on cGO particles as obtained by different conditions of processing i.e., if GO solution is processed to make cGO at 200 C than most of oxygen species are intact and as obtained cGO particles are highly hydrophilic, however, if as obtained cGO particles from processing at 200 C, either through spray drying or through tubular furnace through forced evaporation are further reduced at 300 C, 400 C, 500 C, 600 C, 700 C and 800 C thus getting $cGO|_{300}$; $cGO|_{400}$; $cGO|_{500}$; $cGO|_{600}$; $cGO|_{700}$; $cGO|_{800}$, these different GO products will have a different degree of hydrophobicity as the oxygen sites get reduced with increase in the reduction temperature so $cGO|_{700}$; $cGO|_{800}$ could be highly hydrophobic but will have some residual oxygen functional groups left on its surface thus providing certain degree of solubility in the solvent like water for even otherwise highly hydrophobic crumpled 3D balls. So, idea here is to take $cGO|_{200}$; $cGO|_{300}$; $cGO|_{400}$; $cGO|_{500}$; and disperse them into deionized water or injectant and pass it through reservoir. Since $cGO|_{200}$ $cGO|_{300}$ and $cGO|_{400}$ can have more predominantly a hydrophilic character whereas, say $cGO|_{600}$; $cGO|_{700}$; $cGO|_{800}$ could be hydrophobic in character. Thus, in this cocktail, the crumpled three-dimensional cGO|$_{200}$ will try to keep the dispersion stable due to its more predominant hydrophilic character while bumping into cGO|$_{500}$, cGO|$_{600}$; cGO|$_{700}$; cGO|$_{800}$ type particles thus the amphiphilic character of cocktail makes it interesting for applications like enhanced oil recovery. This embodiment of this invention can be useful in altering wettability, lowering IFT, or physically desorbing residual oil in EOR and IOR processes. It could also be that water slug containing the hydrophobic species i.e., r-cGO|$_{300}$; r-cGO|$_{400}$; r-cGO|$_{500}$; r-cGO|$_{600}$; r-cGO|$_{700}$; r-cGO|$_{800}$ and stabilized by residual oil layer in the produced water or formation water or added to injection water on purpose some compounds of this residual oil will absorb on these. r-cGO|$_{200}$ . . . r-cGO|$_{800}$ particles and thus creates the steric repulsions and keep the hydrophobic particles stably dispersed into the injection water, on the contact this water bearing injectant will lead to the removal of residual oil from formation.

An additional embodiment of this invention states that various graphene oxide species i.e., GO; r-cGO|$_{300}$; r-cGO|$_{400}$; r-cGO|$_{500}$; r-cGO|$_{600}$; r-cGO|$_{700}$; cGO|$_{800}$ will demonstrate variations in colloidal behavior as described in the table 1. The colloidal behavior of these different forms of graphene oxide can be characterized by parameters such as: (a) solubility; (b) dispersibility; (c) hydrophobicity; (d) hydrophilicity; (e) colloidal stability. It seems that oxidation of graphite powder to graphene oxide (GO) introduces oxygen containing groups such as hydroxyl, carboxyl, and epoxy and large percentage of these groups on GO surface ensures good water solubility and stable colloidal behavior. This shows that native GO particles can demonstrate excellent water solubility and dispersibility. As GO is crumpled and reduced due to aerosol evaporation or other methods these oxygen species could be removed due to the application of high heat or chemical treatment thus shifting its behavior to highly hydrophilic to oleophilic or hydrophobic. However, between these two extremes of hydrophilicity and hydrophobicity there could be several GO species can be generated which might have certain degree of hydrophilicity but also demonstrate certain degree of hydrophobicity as shown in table 1. This invention states that dispersing these various crumpled three-dimensional GO particles in water may provide a self-dispersible, universal dispersion fluid for EOR/IOR.

In another embodiment of this invention the crumpled 3D balls of graphene or graphene oxide can be uniformly dispersed into a water droplet which is further dispersed, dissolved, or suspended in supercritical or liquid carbon dioxide and thus, being used to stimulate the reservoir and remove the residual oil. These 3D balls can also be dispersed directly into carbon dioxide.

In an additional embodiment it could be that 60-80% hydrophobic particles are in there in the self-dispersion fluid whereas, 20-40% are hydrophilic particles i.e., r-$cGO|_{200}$ act as spacer to keep things dispersed or floating.

The tendency of 2D graphene sheets to re-stack due to strong pi-pi interactions hinders efficient enhanced oil recovery in upstream applications. A significant decrease in accessible surface area and aqueous stability results from this re-stacking which limits their large-scale application at actual reservoir conditions of heat and salinity. De-spacers like water and carbon nanotubes (CNTs) have been employed to minimize the effects of restacking or avoiding restacking altogether, however, these methods do not guarantee the availability of high specific surface area which is hall mark of graphene sheets. It is thus suggested that instead of functionalizing 2D sheets, it would be much more reliable and economical to transform the 2D sheets into 3D crumpled structures which provide an outstanding compression-aggression resistant property.

In another additional embodiment of this invention it is described that by tuning the degree of reduction on "GO", structures one could control the hydrophobicity and hydrophilicity of a GO-based structure or ball. It may be a crumpled GO ball or it may be a GO based capsule which could be used to suck or absorb the oil, so this tunable property of oil carrier whether it be a GO capsule or crumpled ball can be very interesting as it could mean that GO crumpled balls or capsules can only be reduced enough that they still retain some of their hydrophilic character when dissolved in the water, fresh or formation water, or sea water and that makes their transport easy but at the same time they have significant hydrophobic structure, so when they encounter the oil, they will absorb the oil and be transported back to surface where they can be recharged again and reused again. So this makes two characteristics: a) crumpling or container type organized structures will lead to the repulsion or a kind of pushing away from each other thus, this will make them retain these individually whereas tunable hydrophobic and hydrophilic structures will lead to a proper balance of solubility/dispersion in water to the attachment to oil thus, leading to a great dual character that with water based front they are transported to the oil zone and they attract/suck or absorb oil and goes to surface with water front where oil is removed and they are recycled back to well thus producing a sustainable solution which could be recycled back again.

An additional embodiment of this study is covering the sustainability of EOR/IOR solution described here. Unlike silica nanoparticles and variety of other surfactants used the 3D GO balls are also decorated with iron oxide ($Fe_3O_4$). The iron oxide i.e., $Fe_3O_4$ can be obtained from waste resource of Iron Ore tailings (IOTs). Magnetite/reduced graphene oxide composite can be in cured form, from iron ore tailings (IOTs). Magnetite/GO or Magnetite/rGO is done first by obtaining plain $Fe_3O_4$ from IOTs. This is done by leaching IOTs with HCl followed by coprecipitation. Once plain $Fe_3O_4$, precipitate is obtained it is anchored to graphene/GO templates or structures with the help of a surface directing agents through a hydrothermal method.

An additional embodiment of this invention describes an approach to synthesize iron oxide ($Fe_3O_4$) from waste iron ore tailings (IOTs) to obtain magnetic graphene ($Fe_3O_4$/RGO). Plain $Fe_3O_4$ is prepared by acid leaching of IOTs with HCl followed by coprecipitation. The anchoring of $Fe_3O_4$ was done on to graphene template by hydrothermal method involving poly vinyl pyrrolidone (PvPs) as a surface directing agent. Synthesis of magnetic graphene composite from IOTs can be exceptionally low-cost and may provide an environmentally friendly option.

The hydrocarbon recovery during secondary and tertiary phases are strongly influenced by pore volume injection of injectant fluids as shown in the FIG. 1. This figure shows that for water even at much higher pore volume injection the recovery increase is incremental whereas, for other injectant combinations recoveries can be boosted with different combinations of water, surfactant, or water alternative gas drive etc., However, all these cases require significant pore volume injectants to boost recoveries during secondary and tertiary phases. The more the volume of injectant is required higher will be the cost of recovery process therefore, at some point it will not be economically viable to recover further hydrocarbons from a subterranean formation and the decision may be made to abandon operations. The self-dispersion injectant of this invention suggest that this fluid can induce exceedingly high recoveries even at much lower pore volume injectivity. Thus, providing an economically viable solution to induce high recoveries from mature oil fields and residual zones with minimum expenditures. This type of injectant is environmentally friendly and a considerable proportion can be recovered and re-injected thus further reducing the overall cost. Moreover, this can provide a standardized solution as it does not require specific surface functionalization or specific surfactants for specific underground formations and reservoirs thus reducing the overall cost and worries about adverse environmental impact.

In another embodiment this invention describes a simpler, lower-cost, easily scalable method for mass production of graphene sheet-based nano-$Fe_2O_3$ composites for EOR and IOR applications. The method is based on spray drying a 2-dimensional aqueous solution of graphene sheet and 5-10 nm $Fe_2O_3$ particles into a 3-dimensional crumpled graphene-$Fe_2O_3$ particles. These graphene-$Fe_2O_3$ particles are aggregation resistant and can provide a good dispersibility as well as oil recovery. Moreover, these particles can be separated from produced oil through a magnetic field and regenerated for next cycle by simple water washing thus lowering the cost of oil recovery and boosting the IOR/EOR economics. This resolves one of the major issues faced by graphene-composites as for most applications the graphene sheets (GS) would tend to restack and form the agglomerates even if the one face is functionalized by a surfactant under the harsh reservoir conditions of heat and salinity these surface functionalities could degrade thus leading to the restacking and formation of aggregates. This invention suggests that by forming three dimensional $Fe_2O_3$-GS composites the aggregation formation can be avoided, and high-surface area composites could provide an excellent stimulant to boost more oil from maturing reservoirs.

One additional embodiment of this invention states that three-dimensional (3D) graphene oxide balls described in this invention are self-soluble and self-dispersible in water, biodegradable, non-toxic, amphiphilic and can form stable colloids without any on-purpose surface modification or the addition of solution stabilizer additives.

One embodiment of this invention implies that by tuning the degree of reduction on, "GO", structure the hydrophobicity and hydrophilicity can be controlled be it a crumpled GO ball or be it a GO-based capsule which could be used to suck or absorb the oil, so this tunable property could be very interesting what it means that GO crumpled balls or capsules can only be reduced enough that they are hydrophobic and hydrophilic only to an extent that they can be dissolved in the water, fresh or formation water or sea water and that makes their transport easy but they have significant hydrophobic structure, so when they encounter the oil in the formation, they will absorb the oil due to oils' higher affinity and once be transported back to the surface where they can be recharged and reused again for large number of cycles. So this makes two characteristics: a) crumpling or container type organized structures will lead to the repulsion or a kind of pushing away from each other thus, this will make them retain these individually whereas, tunable hydrophobic & hydrophilic structures will lead to a proper balance of solubility/dispersion in water to the attachment to oil thus, leading to a great dual character that with water based front they are transported to oil zone and they suck or absorb the oil and goes to surface with water front where oil is removed and they are recycled back to the well thus providing a sustainable solution.

This invention will provide an exceptionally low cost and a global solution for all kind of Oil & Gas stimulation and recovery operations because it does not require any formation specific surface functionalization on the crumpled 3D balls of graphene oxide and graphene. The inherent surface of graphene oxide itself contains the functionalities which will provide a self-dispersion capability to crumpled GO balls and this surface can be tuned by thermal reduction methods or by sub-cooling methods to provide oleophilic three-dimensional structures so on one hand certain type of functionalities will provide hydrophilic and at the same time these could be further tuned to provide oleophilic functionalities. In contrast to invention described in this application the nanoparticles must have surface functionalization for them to be stably dispersed in water or in the formation water. The surface functionalization for nanoparticles is required for them not to make aggregates upon exposure to brine, saltwater. Thus, for all practical applications the nanoparticles must have a surface functionalization that stabilizes the colloidal silica. The surface functionalization of colloidal silica allows the colloidal silica to be resistant to the effects of brine i.e., salinity of formation water and heat of reservoir. The surface functionalization of colloidal silica is typically referred to as "brine resistant silica sols". Hydrocarbon recovery fluids comprising surface functionalized colloidal silica are used along with the water or gases to effectuate the further removal of hydrocarbons from under-performing wells. This invention highlights that no surface functionalization will be required, and bare GO dispersed in water or gas can aid in recovering the hydrocarbons from reservoirs thus providing a one universal and standard solution for all type of subterranean formations thus providing a low-cost option for large scale adaptability.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, although the present invention has been specifically disclosed by preferred embodiments and optional features, modification and variation of the concepts herein disclosed may be resorted to by those skilled in the art, and that such modifications and variations are within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims

TABLE 1

Variation of carbon, oxygen, solubility and dispersibility of GO, cGO|200, cGO|300, cGO|400, cGO|500, cGO|600, cGO|700 and cGO|800 in water

|  | GO | cGO\|200 | cGO\|300 | cGO\|400 | cGO\|500 | cGO\|600 | cGO\|700 | cGO\|800 |
|---|---|---|---|---|---|---|---|---|
| Carbon (% age) | 47.94% | 53.85% | 57.85% | 62.31% | 67.85% | 73.48% | 78.89% | 82.35% |
| Oxygen (% age) | 48.65% | 44.12% | 41.65% | 36.89% | 31.05% | 26.12% | 20.12% | 14.65% |
| Solubility (μg/ml) | 7.48 | 5.31 | 3.42 | 3.01 | 2.87 | 2.12 | 1.21 | 0 |
| Dispersibility (μg/ml) | 8.28 | 7.41 | 6.87 | 6.23 | 5.47 | 4.32 | 4.021 | 3.32 |

The invention claimed is:

1. A method to enable well stimulation and hydrocarbon recovery, comprising:
    forming a non-surface functionalized and self-dispersible additive comprising crumpled graphene balls and an injectant fluid, the crumpled graphene balls are configured to not aggregate together and increase in stiffness when under mechanical stress;
    combining the self-dispersible additive with at least one of a freshwater slug, a formation water slug, a produced water slug, a brackish water slug, a produced gas, a natural gas liquid, diesel fuel, supercritical $CO_2$, $CO_2$, nitrogen, argon, and natural gas to thereby form a self-dispersion fluid;
    introducing the self-dispersion fluid into an underground formation containing hydrocarbons;
    recovering the crumpled graphene balls from the underground formation; and
    recovering hydrocarbons that are coupled to the crumpled graphene balls.

2. The method of claim 1, wherein the crumpled graphene is present at a concentration of 0.0001-0.1%.

3. The method of claim 1, wherein the crumpled graphene balls comprise a diameter of 20-700 nm.

4. The method of claim 1, wherein the crumpled graphene balls comprises a specific surface area of 150-600 $m^2/g$.

5. The method of claim 1, wherein the crumpled graphene balls comprises a crude adsorption capacity of 45-985 kg of crude oil/kg of crumpled graphene.

6. The method of claim 1, wherein
    the crumpled graphene balls comprise crumpled graphene oxide balls.

7. The method of claim 1, wherein
    the crumpled graphene balls comprise:
    a shell-like structure; and
    an inner hollow core.

8. The method of claim 1, wherein
    the crumpled graphene balls comprise iron-oxide coupled thereto.

9. The method of claim 1, wherein
    at least a portion of the crumpled graphene balls are hydrophobic.

10. The method of claim 1, wherein
    at least a portion of the crumpled graphene are hydrophilic.

11. The method of claim 8, wherein
    recovering the crumpled graphene balls comprises recovering the crumpled graphene balls using a magnetic field.

12. A method to enable well stimulation and recover by combining secondary and tertiary phases of hydrocarbon recovery, comprising:
    forming a non-surface functionalized and self-dispersible additive comprising crumpled graphene balls and an injectant fluid, the crumpled graphene balls are configured to not aggregate together and increase in stiffness when under mechanical stress;
    combining the self-dispersible additive with at least one of a freshwater slug, a formation water slug, a produced water slug, a brackish water slug, a produced gas, a natural gas liquid, diesel fuel, supercritical $CO_2$, $CO_2$, nitrogen, argon, and natural gas to thereby form a self-dispersion fluid;
    introducing the self-dispersion fluid into an underground formation containing hydrocarbons;
    recovering the crumpled graphene balls from the underground formation; and
    recovering hydrocarbons that are coupled to the crumpled graphene balls.

* * * * *